United States Patent [19]

Hanamoto

[11] 3,955,008

[45] May 4, 1976

[54] PREPARATION OF ICINGS

[75] Inventor: Max M. Hanamoto, Lafayette, Calif.

[73] Assignee: The United States of America as represented by the Secretary of Agriculture, Washington, D.C.

[22] Filed: Aug. 14, 1975

[21] Appl. No.: 604,859

[52] U.S. Cl. .............................. 426/572; 426/659
[51] Int. Cl.$^2$ .......................................... A23G 3/00
[58] Field of Search ........................... 426/572, 659

[56] References Cited
UNITED STATES PATENTS

| | | | |
|---|---|---|---|
| 3,208,857 | 9/1965 | Howard et al. | 426/572 |
| 3,464,830 | 9/1969 | Wahba | 426/572 |
| 3,886,292 | 5/1975 | Kissell et al. | 426/553 |

*Primary Examiner*—Jeanette M. Hunter
*Attorney, Agent, or Firm*—M. Howard Silverstein; William Takacs; Max D. Hensley

[57] ABSTRACT

The quality of icings is improved by the incorporation of certain additives, namely, fatty acid esters of polyoxyethylene ethers of either propylene glycol glycosides or glycerol glycosides.

8 Claims, No Drawings

PREPARATION OF ICINGS

DESCRIPTION OF THE INVENTION

The invention relates to and has among its objects the production of icings of improved properties for use as toppings and fillings for cakes and other baked goods. Further objects of the invention will be evident from the following description, wherein parts and percentages are by weight unless otherwise specified.

The invention is concerned with icings of the shortening type, that is, icings which are primarily an aerated mixture of edible fat, sugar crystals, and water (or more accurately, aqueous sugar solution). In preparing such icings in the baking trade it is conventional to incorporate an additive to stabilize the product, that is, to preserve its gloss, texture, and volume. The stabilizer prevents air from being released and thus maintains the icing in a desirable aerated (low density) state. Also, the stabilizer promotes emulsification of the fat and aqueous portions of the icing and thus prevents leakage of watery serum caused by separation of fatty and aqueous components.

In accordance with the invention, it has been found that certain compounds are useful as stabilizing additives for shortening-type icings. Products prepared in accordance with the invention have the desirable properties of a smooth and creamy texture, a high gloss, a low density, and excellent stability with regard to both retention of air and maintenance of the emulsified state.

The additives used in accordance with the invention fall into two categories, namely:

a. Fatty acid esters of polyoxyethylene ethers of propylene glycol glycosides; and
b. Fatty acid esters of polyoxyethylene ethers of glycerol glycosides.

Particularly preferred are the compounds derived from starch, and these are referred to herein as:

a. Fatty acid esters of polyoxyethylene ethers of propylene glycol starch glycosides; and
b. Fatty acid esters of polyoxyethylene ethers of glycerol starch glycosides.

In the additives of the invention, the fatty acids contain 12 to 18 carbon atoms, and examples thereof include lauric, myristic, palmitic, stearic, palmitoleic, and oleic acids. The fatty acid moieties of the compounds may be derived from individual fatty acids or from mixtures of fatty acids, for example, those contained in soybean oil, cottonseed oil, corn oil, safflower seed oil, olive oil, lard, hydrogenated cottonseed oil, and the like. It is critical for the purpose of the invention that the proportion of combined fatty acid be limited to 1 to 2 moles thereof per mole of glycoside.

Also critical for the purpose of the invention is that the polyoxyethylene portion of the compounds be 20 moles of combined ethylene oxide per mole of glycoside. In this connection it is to be noted that the same type of compounds, but containing as little as 5 moles of combined ethylene oxide, are useful as additives in cakes and other chemically-leavened baked sweet goods. See Kissell et al., U.S. Pat. No. 3,886,292. The fact that the additives of the invention must contain 20 moles of combined ethylene oxide to provide good results in icings constitutes a surprising and unexpected discovery.

The additives used in accordance with the invention can be prepared by known procedures, for example, those described by Otey, Mehltretter, and Rist, Jour. Am. Oil Chem. Soc., Vol. 40, pp. 76–78 and Griffin, U.S. Pat. No. 2,407,003. Neither the additives per se nor their preparation constitute any part of the invention. For the sake of clarifying the nature of the additives, however, a brief description of their synthesis is set forth below, wherein glycerol derivatives are referred to for purpose of illustration. It will be understood that the propylene glycol derivatives are prepared in similar manner.

In a first step of the synthesis glycerol is reacted with a sugar such as glucose, fructose, galactose, inverted sucrose, xylose, or the like. In general, the glycerol and sugar are combined in approximately mole-to-mole ratio, but an excess of glycerol is usually preferred. A small amount of an added catalyst is added and the reactants are heated to a temperature of 100–140°C. This temperature is maintained until equilibrium is attained, a state generally reached in from 10 to 120 minutes. For synthesizing the preferred additives of the invention, starch is used in place of a sugar. Under the influence of the acidic conditions of the reaction, the starch is degraded and the resulting degradation products, including glucose and oligomers of glucose, react with the glycerol. The resulting glycerol-starch glycoside is a mixture of glycerol glucoside together with other glycerol glycosides wherein the glycoside moieties are oligosaccharide radicals containing several combined glucose units.

In a next step the so-formed glycerol glycoside is converted to a polyoxyethylene ether. In this aspect of the preparation, the glycerol is reacted with ethylene oxide at a temperature preferably in the range 120°–140° C. The ethylene oxide must be added slowly to avoid exceeding the range given above. As noted above, compounds suitable for use in accordance with the invention involve reaction of 1 mole of glycerol glycoside with 20 moles of ethylene oxide.

The final step is the production of the fatty acid ester of the so-prepared polyoxyethylene ether. Fatty acids that can be used in this step include lauric, myristic, palmitic, stearic, palmitoleic, and oleic acids. In general, either saturated or unsaturated longchain fatty acids may be employed, and these may be in the form of individual fatty acids or mixtures of fatty acids derived from fats or oils. The acid or acid mixture is reacted with the intermediate in a ratio of 1 to 2 moles thereof per mole of glycoside. The reaction is generally carried out at temperatures from 180° to 200° C.

The advantages of the invention are secured by incorporating any of the above-described additives into an icing formulation. The amount of additive needed to attain a stable product is dependent on the particular additive used and the proportion of other ingredients. Usually, about 0.5 to 1.5 parts of additive is used per 100 parts of fat. It is generally preferred to incorporate the additive with the fat and then incorporate the so-treated fat with the other ingredients. Other than the instant additives, the icing will contain the usual ingredients well-known in the baking art. Basic ingredients are sugar, water, and edible fat. Part of the sugar may be supplied by a sugar syrup such as corn syrup. Other conventional ingredients such as flavorings, colors, pre-gelatinized starch, egg white, milk, or milk solids may be added as desired. Thus, any suitable recipe for icings may be utilized in accordance with the invention, and it is the intention to include any icing wherein the stabilizing additive is as described above. A typical formulation contains the following approximate proportions of these ingredients: sugar, 38.5%; corn syrup, 23%; shortening containing 0.75% of any of the above-described additives, 23%; and water, 15.5%. A minor amount of flavoring, as for example, vanilla extract, lemon extract, etc. is added as desired. The procedures used in preparing the icings of the invention include the usual operations well-known in the art, namely, mixing of the solid and liquid ingredients, followed by whipping to incorporate air therein whereby to produce an icing of desirable low density.

EXAMPLE

The invention is further demonstrated by the following illustrative example. Some of the experiments reported herein concern formulations not in accordance with the invention. These are included for purpose of comparison.

In these experiments a standard icing recipe was used with variation as to the nature of the additive. The recipe used was as follows:

| Ingredient | Parts |
| --- | --- |
| Sugar | 38.5 |
| Corn syrup | 23.0 |
| Shortening, containing 0.75% additive | 23.0 |
| Water | 15.5 |

The above ingredients were mixed, then whipped for 25 minutes to aerate the icing.

The icings so prepared were tested by conventional methods. Aeration was evaluated by measuring the specific gravity of the icing. A low specific gravity indicates a desirable product--one which retains a large amount of air. In addition, the emulsion stability was evaluated by allowing the icing to stand at room temperature and observing it from time to time for emulsion breakdown, which is manifested by separation of watery serum. It is obvious that an icing which can stand for a long time without separation of watery serum is a desirable one. The additives tested were as follows:

I and II: Each of these additives was a mixed fatty acid ester of a polyoxyethylene ether of propylene glycol starch glycoside, wherein the fatty acids were derived from soybean oil, and which contained an average of 1.5 moles of combined fatty acids per mole. In one case the additive contained 5 moles of combined ethylene oxide per mole, in another case 20 moles of combined ethylene oxide per mole. In the following table these additives are designated:

I. PE (5) PGSG - S
II. PE (20) PGSG - S

III, IV, and V: Each of these additives was a mixed fatty acid ester of a polyoxyethylene ether of propylene glycol starch glycoside, wherein the fatty acids were derived from lard, and which contained an average of 1.5 moles of combined fatty acids per mole. In one case the additive contained 5 moles of combined ethylene oxide per mole, in another 10 moles of combined ethylene oxide per mole, and in the third 20 moles of combined ethylene oxide per mole. In the following table these additives are designated:

III. PE (5) PGSG - L
IV. PE (10) PGSG - L
V. PE (20) PGSG - L

VI, VII, and VIII: Each of these additives was a mixed fatty acid ester of a polyoxyethylene ether of propylene glycol starch glycoside, wherein the fatty acids were derived from hydrogenated cottonseed oil, and which contained an average of 1.5 moles of combined fatty acids per mole. In one case the additive contained 5 moles of combined ethylene oxide per mole, in another 10 moles of combined ethylene oxide per mole, and in the third 20 moles of combined ethylene oxide per mole. In the following table additives are designated:

VI. PE (5) PGSG - HC
VII. PE (10) PGSG - HC
VIII. PE (20) PGSG - HC

IX and X: Each of these additives was a mixed fatty acid ester of a polyoxyethylene ether of glycerol starch glycoside, wherein the fatty acids were derived from corn oil, and which contained an average of 1.5 moles of combined fatty acids per mole. In one case the additive contained 10 moles of combined ethylene oxide per mole, in the other 20 moles of combined ethylene oxide per mole. In the following table these additives are designated:

IX. PE (10) GSG - C
X. PE (20) GSG - C

XI. In this case the additive was "Polysorbate-60," a conventional additive used in preparing icings. It was used in the proportion of 0.8% based on the weight of shortening.

The results obtained are summarized in the following table:

| No. | Additive | Specific gravity | Stability |
| --- | --- | --- | --- |
| I. | PE (5) PGSG - S* | 0.75 | O.K.** at 120 hrs. |
| II. | PE (20) PGSG - S | 0.51 | O.K. at 120 hrs. |
| III. | PE (5) PGSG - L* | 0.75 | O.K. at 120 hrs. |
| IV. | PE (10) PGSG - L* | 0.65 | Separation of watery serum at 48 hrs. |
| V. | PE (20) PGSG - L | 0.51 | O.K. at 120 hrs. |
| VI. | PE (5) PGSG - HC* | 0.75 | O.K. at 120 hrs. |
| VII. | PE (10) PGSG - HC* | 0.64 | Separation of watery serum at 48 hrs. |
| VIII. | PE (20) PGSG - HC | 0.51 | O.K. at 120 hrs. |
| IX. | PE (10) GSG - C* | 0.62 | O.K. at 120 hrs. |
| X. | PE (20) GSG - C | 0.51 | O.K. at 120 hrs. |
| XI. | "Polysorbate-60" (conventional additive)* | 0.56 | O.K. at 120 hrs. |

*These additives are not within scope of invention; provided for purpose of comparison.
**O.K. designates stable icing; no separation of watery serum.

It is evident from the above tabulation that the additives which contained only 5 or 10 moles of combined ethylene oxide did not provide good results by reason of high density, lack of stability, or both.

Having thus described the invention, what is claimed is:

1. An icing for bakery products being an aerated mixture comprising sugar, water, edible fat, and an additive,
   wherein the additive is an ester of a fatty acid containing 12 to 18 carbon atoms and a polyoxyethylene ether of a propylene glycol glycoside, containing 1 to 2 moles of combined fatty acid per mole thereof, and 20 moles of combined ethylene oxide per mole thereof,
   said additive being present in an amount of about 0.5% to 1.5% based on the weight of fat.

2. An icing for bakery products being an aerated mixture comprising sugar, water, edible fat, and an additive,
wherein the additive is an ester of a fatty acid containing 12 to 18 carbon atoms and a polyoxyethylene ether of propylene glycol starch glycoside, containing 1 to 2 moles of combined fatty acid per mole thereof, and 20 moles of combined ethylene oxide per mole thereof,
said additive being present in an amount of about 0.5% to 1.5% based on the weight of fat.

3. An icing for bakery products being an aerated mixture comprising sugar, water, edible fat, and an additive,
wherein the additive is an ester of a fatty acid containing 12 to 18 carbon atoms and a polyoxyethylene ether of a glycerol glycoside, containing 1 to 2 moles of combined fatty acid per mole thereof, and 20 moles of combined ethylene oxide per mole thereof,
said additive being present in an amount of about 0.5% to 1.5% based on the weight of fat.

4. An icing for bakery products being an aerated mixture comprising sugar, water, edible fat, and an additive,
wherein the additive is an ester of a fatty acid containing 12 to 18 carbon atoms and a polyoxyethylene ether of glycerol starch glycoside, containing 1 to 2 moles of combined fatty acid per mole thereof, and 20 moles of combined ethylene oxide per mole thereof,
said additive being present in an amount of about 0.5% to 1.5% based on the weight of fat.

5. A process for preparing an icing, which comprises mixing sugar, water, edible fat, and an additive, and aerating the mixture,
wherein the additive is an ester of a fatty acid containing 12 to 18 carbon atoms and a polyoxyethylene ether of a propylene glycol glycoside, containing 1 to 2 moles of combined fatty acid per mole thereof, and 20 moles of combined ethylene oxide per mole thereof,
said additive being present in an amount of about 0.5% to 1.5% based on the weight of fat.

6. A process for preparing an icing, which comprises mixing sugar, water, edible fat, and an additive, and aerating the mixture,
wherein the additive is an ester of a fatty acid containing 12 to 18 carbon atoms and a polyoxyethylene ether of propylene glycol starch glycoside, containing 1 to 2 moles of combined fatty acid per mole thereof, and 20 moles of combined ethylene oxide per mole thereof,
said additive being present in an amount of about 0.5% to 1.5% based on the weight of fat.

7. A process for preparing an icing, which comprises mixing sugar, water, edible fat, and an additive, and aerating the mixture,
wherein the additive is an ester of a fatty acid containing 12 to 18 carbon atoms and a polyoxyethylene ether of a glycerol glycoside, containing 1 to 2 moles of combined fatty acid per mole thereof, and 20 moles of combined ethylene oxide per mole thereof,
said additive being present in an amount of about 0.5% to 1.5% based on the weight of fat.

8. A process for preparing an icing, which comprises mixing sugar, water, an edible fat, and an additive, and aerating the mixture,
wherein the additive is an ester of a fatty acid containing 12 to 18 carbon atoms and a polyoxyethylene ether of glycerol starch glycoside, containing 1 to 2 moles of combined fatty acid per mole thereof, and 20 moles of combined ethylene oxide per mole thereof,
said additive being present in an amount of about 0.5% to 1.5% based on the weight of fat.

* * * * *